United States Patent
Baskaran et al.

(10) Patent No.: US 9,763,177 B1
(45) Date of Patent: Sep. 12, 2017

(54) FALSE CELL FILTERING DURING CELL SEARCH

(71) Applicant: MBIT WIRELESS, INC., Newport Beach, CA (US)

(72) Inventors: Ganesh Baskaran, Puducherry (IN); Krishnavelan Sivaraman, Puducherry (IN); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/017,762

(22) Filed: Feb. 8, 2016

(51) Int. Cl.
*H04W 48/16* (2009.01)
*H04L 12/26* (2006.01)
*H04J 11/00* (2006.01)

(52) U.S. Cl.
CPC .............. *H04W 48/16* (2013.01); *H04L 43/16* (2013.01); *H04J 11/0073* (2013.01); *H04J 11/0076* (2013.01)

(58) Field of Classification Search
CPC ............... H04J 11/0073; H04J 11/0076; H04J 2011/0096; H04W 24/08; H04W 48/16; H04L 43/16; H04B 17/336
See application file for complete search history.

(56) References Cited

U.S. PATENT DOCUMENTS

2015/0071103 A1* 3/2015 Xu .................. H04L 43/028
370/252

\* cited by examiner

*Primary Examiner* — Nam Huynh

(74) *Attorney, Agent, or Firm* — Lerner, David, Littenberg, Krumholz & Mentlik, LLP

(57) ABSTRACT

During cell search procedure in 3GPP LTE wireless communication system it is required to detect multiple cells which may be observable by a client terminal. In conventional cell detection a client terminal may detect false cells along with true cells. The number of false cells may depend on specific conventional detection algorithm used. A method and apparatus are disclosed that use of Differential Correlation based SINR metric for filtering out false cells from the list of detected cells reported by the conventional cell detection methods. The combination of conventional cell detection and Differential Correlation SINR based false cell filtering enables significant reduction in false cells reported to the network and reduces power consumption in a client terminal.

20 Claims, 20 Drawing Sheets

FALSE CELL FILTERING DURING CELL SEARCH

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred to as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many wireless communication systems, normally the communication between the base station and client terminals is organized into frames as shown in FIG. 3. The frame duration may be different for different communication systems and normally it may be in the order of milliseconds. For a given communication system the frame duration may be fixed. For example, the frame duration may be 10 milliseconds.

In a TDD wireless communication system, a frame may be divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel.

Orthogonal Frequency Division Multiplexing (OFDM) systems typically use Cyclic Prefix (CP) to combat inter-symbol interference and to maintain the subcarriers orthogonal to each other under a multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred herein as OFDM signal.

FIG. 5 illustrates the relative timing of the signals from different base stations as observed by a client terminal. A client terminal may observe signals from base stations that may be using different CP types as illustrated in FIG. 5.

Most wireless communication systems may employ some form of framing in the air interface. For example, 10 ms radio frames are used in the $3^{rd}$ Generation Partnership Project (3GPP) Long Term Evolution (LTE) wireless communication system and each radio frame comprises 10 subframes as shown in FIG. 6. Each subframe in turn consists of two slots and each slot consists of 6 or 7 OFDM symbols depending on the type of CP used as shown in FIG. 6. In the 3GPP LTE wireless communication system, two different CP lengths are used and they are referred to as Normal CP and Extended CP. In wireless communication systems, normally the specific air interface frame structure repeats itself over certain periodicity.

The 3GPP LTE wireless communication system uses the following synchronization signals to assist the client terminal in achieving time and frequency synchronization as well as the detection of Physical layer Cell Identity (PCI):

Primary Synchronization Signal (PSS)
Secondary Synchronization Signal (SSS)

The positions of the PSS and SSS within a frame are illustrated in FIG. 7 for FDD air-interface of a 3GPP LTE wireless communication system. Note that the figure shows the position of the PSS and SSS for both the Normal CP and Extended CP. FIG. 8 illustrates the PSS and SSS positions for TDD air-interface of 3GPP LTE wireless communication system. The PSS and SSS for different cells may be different as described below.

The different PSS and SSS are identified by different signal sequences used for transmission. Specifically, 504 PCI's are defined in 3GPP LTE wireless communication system specifications and they are organized into 168 groups with three identities in each group. The SSS sequence identifies the PCI group and PSS identifies the PCI within a group. Detecting a PCI requires the detection of both the PSS and the SSS.

The PSS sequence in frequency domain is a length 63 Zadoff-Chu sequence extended with five zeros on each side and mapped to central 72 sub-carriers as shown in FIG. 9. The Direct Current (d.c.) subcarrier is not used. In 3GPP LTE wireless communication system three different PSS sequences are used with Zadoff-Chu root indices 24, 29 and 34 corresponding to cell identity 0, 1 and 2 respectively within the PCI group. The exact PSS sequences are defined in the 3GPP LTE specification TS 36.211 "Physical Channels and Modulation," Jan. 6, 2016, incorporated by reference herein. The time domain PSS signal may be obtained by performing Inverse Discrete Fourier Transform (IDFT) of the frequency domain PSS. The two time domain PSS instances present within a 10 ms radio frame as shown in FIG. 7 and FIG. 8 are identical.

The SSS sequences in frequency domain are generated by frequency interlacing of two length-31 M-sequences X and Y, each of which may take 31 different M-values. The SSS is extended with five zeros on each side and mapped to central 72 sub-carriers as shown in FIG. 10. The d.c. subcarrier is not used. In 3GPP LTE wireless communication system, 168 valid combinations of X and Y are defined corresponding to 168 different PCI groups. The particular values of X and Y are referred herein with $m_0$ and $m_1$. For each of the $m_0$ and $m_1$, there are 31 different values possible. Therefore, the 168 valid PCI groups include $m_0$ and $m_1$ combinations that may have one of the two sequences common with other PCI groups. The time domain SSS signal may be obtained by performing IDFT of the frequency domain SSS. The two SSS sequences present in a 10 ms radio frame are different, namely $SSS_1$ and $SSS_2$ as shown in FIG. 7 and FIG. 8, which allows the client terminal to detect 10 ms radio frame timing from reception of a single SSS. As shown in FIG. 10, the only difference between $SSS_1$ and $SSS_2$ is that the two M-sequences X and Y used in $SSS_1$ are swapped in $SSS_2$. Whether an $SSS_1$ or $SSS_2$ is detected may be indicated by a flag indicating SSS occurrence. The exact relative timing between SSS and PSS depends upon CP type and duplexing type as shown in FIG. 7 and FIG. 8.

At the end of PSS search, OFDM symbol synchronization may be achieved. Therefore, frequency domain processing may be employed for further analysis, such as SSS detection.

The SSS search has to handle unknown timing and frequency offsets in addition to other system unknowns such as CP type and duplexing type. The relative timing (in terms of number of samples) between SSS and PSS varies depending upon CP and duplexing type. Multiple SSS search attempts may be required to resolve unknown system parameters such as CP type and duplexing type. If CP type is known prior to SSS detection, for example using CP correlator, corresponding SSS detection attempt may be skipped. The PSS detection may result in multiple possible PSS positions being detected due to the presence of multiple cells surrounding the client terminal as illustrated in FIG. 5.

In a conventional SSS detection procedure, along with the true cell identification, a high number of false cells may be detected due in part to the search attempts over multiple hypotheses. A cell is said to be a false cell when a cell with the detected PCI is not actually present and yet the PCI is detected during the SSS search procedure. The detection of false cells requires the client terminal to measure and keep track of the qualifying metrics of the false cells in addition to the metrics of the true cells and has to make cell reselection/handover decisions based on the metrics of cells that do not actually exist. This may lead to unnecessary increase in power consumption. Furthermore, if the false cells are present in the detected cell list from SSS processing, unnecessary cell reselections/handover may occur which may reduce the network efficiency and client terminal performance.

SUMMARY

A method and apparatus are disclosed that enable reduction in the number of false cells detected during SSS search procedure by using the Differential Correlation (DC) to estimate Signal to Interference plus Noise Ratio (SINR) metric for filtering. The phrase "DC based SINR" and the term SINR are used interchangeably herein and SINR represents DC based SINR in this disclosure.

In accordance with an aspect of the disclosure, a method for base station validation at a client device in a wireless communication system may include: controlling, by a processing device, for each time domain sample extracted from of a signal from a base station received at the client device and corresponding to a detected Primary Synchronization Signal (PSS) offset, searching an output from converting the time domain sample to frequency domain for a Secondary Synchronization Signal (SSS); and controlling, by the processing device, for each base station indicated based on the searching for the SSS, determining whether a given base station is valid using a Differential Correlation (DC) based Signal to Interference plus Noise Ratio (SINR) metric corresponding to the base station.

In one alternative, a plurality of base stations may be indicated based on the searching for the SSS, and, for each of the plurality of base stations, the DC based SINR metric may be determined over a predetermined filtering window.

In one alternative, the method may include controlling, by the processing device, determining, as a valid base station, each base station of the plurality of base stations having the DC based SINR metric greater than or equal to a predetermined threshold.

In one alternative, a plurality of base stations may be indicated based on the searching for the SSS, and the method may include controlling, by the processing device, during the searching for the SSS for a given base station of the base stations, determining the DC based SINR metric for the given base station.

In one alternative, a plurality of base stations may be indicated from the searching for the SSS, and each time domain sample corresponding to a given detected PSS for a given base station of the base stations may be converted to frequency domain by Fast Fourier Transform (FFT); and the method may include: controlling, by the processing device, for each PSS offset detected for the given base station, storing in a memory each SSS determined from searching the output of converting each time domain sample for the given base station corresponding to the PSS offset detected to frequency domain by Fast Fourier Transform, and controlling, by the processing device, determining the DC based SINR metric for the given base station when the searching for the SSS for each PSS offset detected for the given base station is completed.

In one alternative, the DC based SINR metrics may be determined respectively for the plurality of base stations by coherently combining intermediate metrics determined for different SSS intervals within the predetermined filtering windows.

In one alternative, a plurality of base stations may be indicated based on the searching for the SSS, and the method may include: controlling, by the processing device, determining, from the plurality of base stations, a base station (Dominant Base Station) having a highest DC based SINR metric (Maximum SINR), determining a Dynamic threshold by subtracting a Relative SINR from the Maximum SINR, in which the Relative SINR is a largest amount by which a DC based SINR metric of a given base station from the plurality of base stations can be less than the Maximum SINR of the Dominant Base Station and the given base station can be a potentially valid base station, setting a Final Threshold equal to the Dynamic threshold, when the dynamic threshold is determined to be greater than an absolute lowest value of a DC based SINR metric for a second given base station from the plurality of base stations such that the second given base station can be a potentially valid base station (Minimum SINR), setting the Final Threshold equal to the Minimum SINR, when the dynamic threshold is determined to be not greater than the Minimum SINR, and determining, as a valid base station, each base station from the plurality of base stations having the DC based SINR metric greater than or equal to the Final Threshold.

In accordance with an aspect of the disclosure, an apparatus for base station validation at a client device in a wireless communication system may include circuitry configured to control: for each time domain sample extracted from of a signal from a base station received at the client device and corresponding to a detected Primary Synchronization Signal (PSS) offset, searching an output from converting the time domain sample to frequency domain for a Secondary Synchronization Signal (SSS); and for each base station indicated based on the searching for the SSS, determining whether a given base station is valid using a Differential Correlation (DC) based Signal to Interference plus Noise Ratio (SINR) metric corresponding to the base station.

In one alternative of the apparatus, a plurality of base stations may be indicated based on the searching for the SSS, and, for each of the plurality of base stations, the DC based SINR metric may be determined over a predetermined filtering window.

In one alternative of the apparatus, the circuitry may be configured to control determining, as a valid base station, each base station of the plurality of base stations having the DC based SINR metric greater than or equal to a predetermined threshold.

In one alternative of the apparatus, a plurality of base stations may be indicated based on the searching for the SSS, and the circuitry may be configured to control, during the searching for the SSS for a given base station of the base stations, determining the DC based SINR metric for the given base station.

In one alternative of the apparatus, a plurality of base stations may be indicated from the searching for the SSS; each time domain sample corresponding to a given detected PSS for a given base station of the base stations may be converted to frequency domain by Fast Fourier Transform (FFT); and the circuitry may be configured to control for each PSS offset detected for the given base station, storing in a memory each SSS determined from searching the output of converting each time domain sample for the given base station corresponding to the PSS offset detected to frequency domain by Fast Fourier Transform, and determining the DC based SINR metric for the given base station when the searching for the SSS for each PSS offset detected for the given base station is completed.

In one alternative of the apparatus, the DC based SINR metrics may be determined respectively for the plurality of base stations by coherently combining intermediate metrics determined for different SSS intervals within the predetermined filtering windows.

In one alternative of the apparatus, a plurality of base stations may be indicated based on the searching for the SSS; and the circuitry may be configured to control: determining, from the plurality of base stations, a base station (Dominant Base Station) having a highest DC based SINR metric (Maximum SINR), determining a Dynamic threshold by subtracting a Relative SINR from the Maximum SINR, in which the Relative SINR is a largest amount by which a DC based SINR metric of a given base station from the plurality of base stations can be less than the Maximum SINR of the Dominant Base Station and the given base station can be a potentially valid base station, setting a Final Threshold equal to the Dynamic threshold, when the dynamic threshold is determined to be greater than an absolute lowest value of a DC based SINR metric for a second given base station from the plurality of base stations such that the second given base station can be a potentially valid base station (Minimum SINR), setting the Final Threshold equal to the Minimum SINR, when the dynamic threshold is determined to be not greater than the Minimum SINR, and determining, as a valid base station, each base station from the plurality of base stations having the DC based SINR metric greater than or equal to the Final Threshold.

In accordance with an aspect of the disclosure, a wireless communication device may include: a receiver for receiving a signal in a wireless communication system; and a processing device configured for base station validation. The processing device may be configured to control: for each time domain sample extracted from of a signal from a base station received at the client device and corresponding to a detected Primary Synchronization Signal (PSS) offset, searching an output from converting the time domain sample to frequency domain for a Secondary Synchronization Signal (SSS); and for each base station indicated based on the searching for the SSS, determining whether a given base station is valid using a Differential Correlation (DC) based Signal to Interference plus Noise Ratio (SINR) metric corresponding to the base station.

In one alternative of the wireless communication device, a plurality of base stations may be indicated based on the searching for the SSS, and, for each of the plurality of base stations, the DC based SINR metric may be determined over a predetermined filtering window.

In one alternative of the wireless communication device, the processing device may be configured to control determining, as a valid base station, each base station of the plurality of base stations having the DC based SINR metric greater than or equal to a predetermined threshold.

In one alternative of the wireless communication device, a plurality of base stations may be indicated based on the searching for the SSS, and the processing device may be configured to control, during the searching for the SSS for a given base station of the base stations, determining the DC based SINR metric for the given base station.

In one alternative of the wireless communication device, a plurality of base stations may be indicated from the searching for the SSS; each time domain sample corresponding to a given detected PSS for a given base station of the base stations may be converted to frequency domain by Fast Fourier Transform (FFT); and the processing device may be configured to control for each PSS offset detected for the given base station, storing in a memory each SSS determined from searching the output of converting each time domain sample for the given base station corresponding to the PSS offset detected to frequency domain by Fast Fourier Transform, and determining the DC based SINR metric for the given base station when the searching for the SSS for each PSS offset detected for the given base station is completed.

In one alternative of the wireless communication device, a plurality of base stations may be indicated based on the searching for the SSS; and the processing device may be configured to control: determining, from the plurality of base stations, a base station (Dominant Base Station) having a highest DC based SINR metric (Maximum SINR), determining a Dynamic threshold by subtracting a Relative SINR from the Maximum SINR, in which the Relative SINR is a largest amount by which a DC based SINR metric of a given base station from the plurality of base stations can be less than the Maximum SINR of the Dominant Base Station and the given base station can be a potentially valid base station, setting a Final Threshold equal to the Dynamic threshold, when the dynamic threshold is determined to be greater than an absolute lowest value of a DC based SINR metric for a second given base station from the plurality of base stations such that the second given base station can be a potentially valid base station (Minimum SINR), setting the Final Threshold equal to the Minimum SINR, when the dynamic threshold is determined to be not greater than the Minimum SINR, and determining, as a valid base station, each base station from the plurality of base stations having the DC based SINR metric greater than or equal to the Final Threshold.

DETAILED DESCRIPTION

Figure 1:
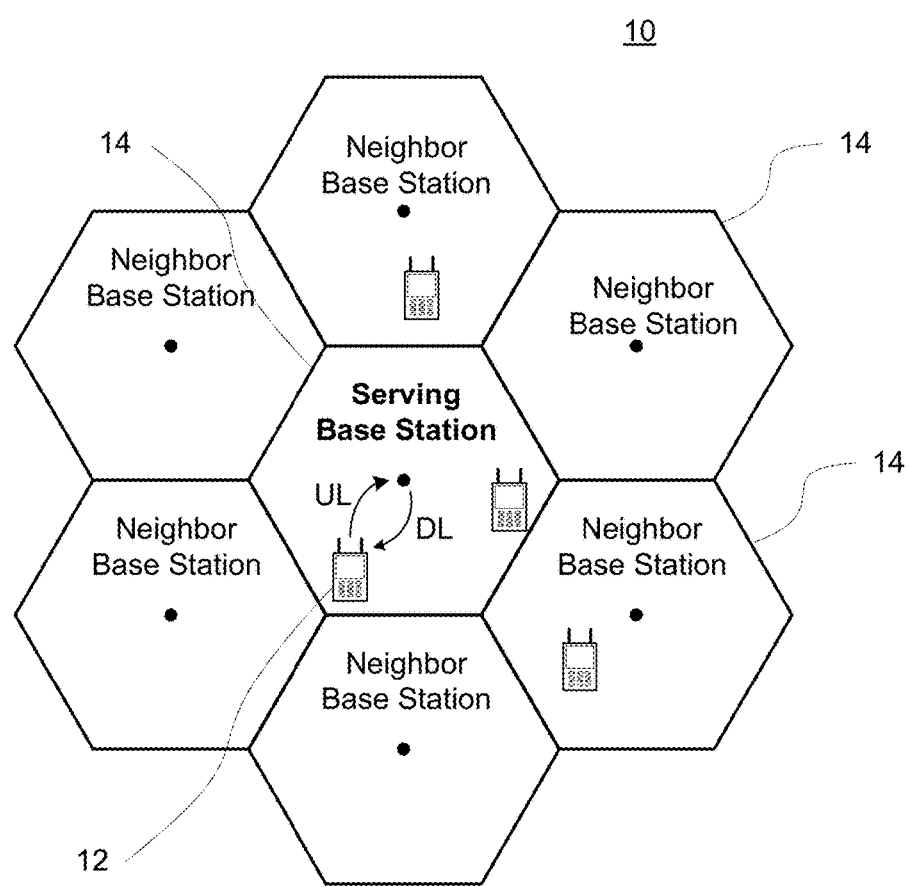
FIG. 1 illustrates a conventional wireless cellular communication system.
Figure 2:
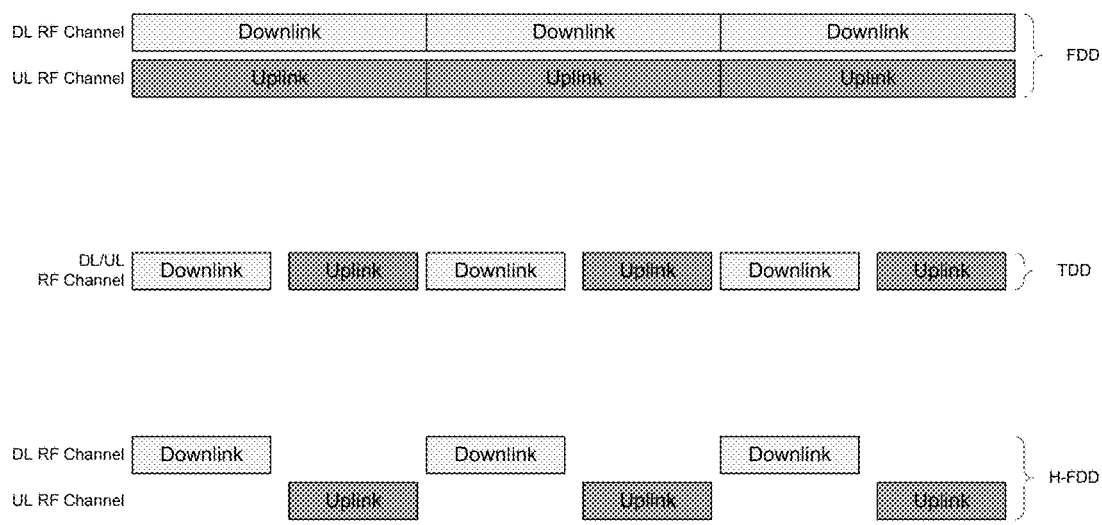
FIG. 2 illustrates FDD, TDD and H-FDD duplexing techniques.
Figure 3:
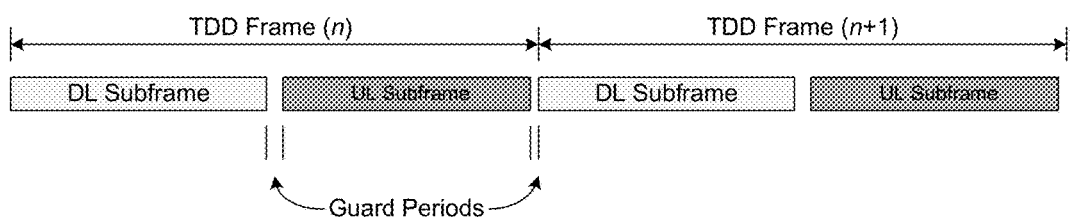
FIG. 3 illustrates a TDD frame consisting of DL portions and UL portions.
Figure 4:
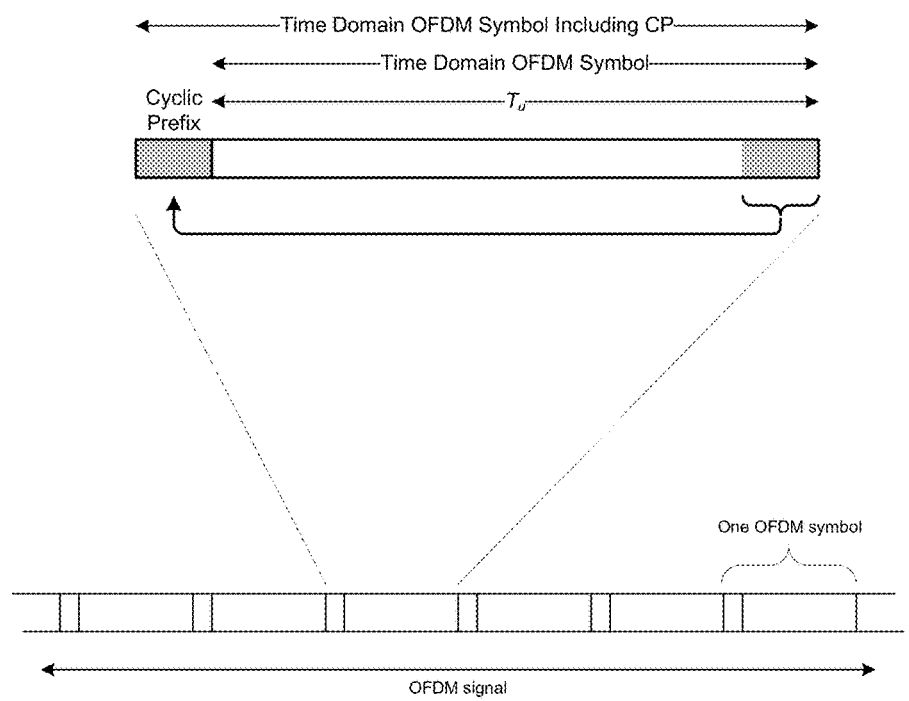
FIG. 4 illustrates an OFDM symbol with Cyclic Prefix Insertion.
Figure 5:
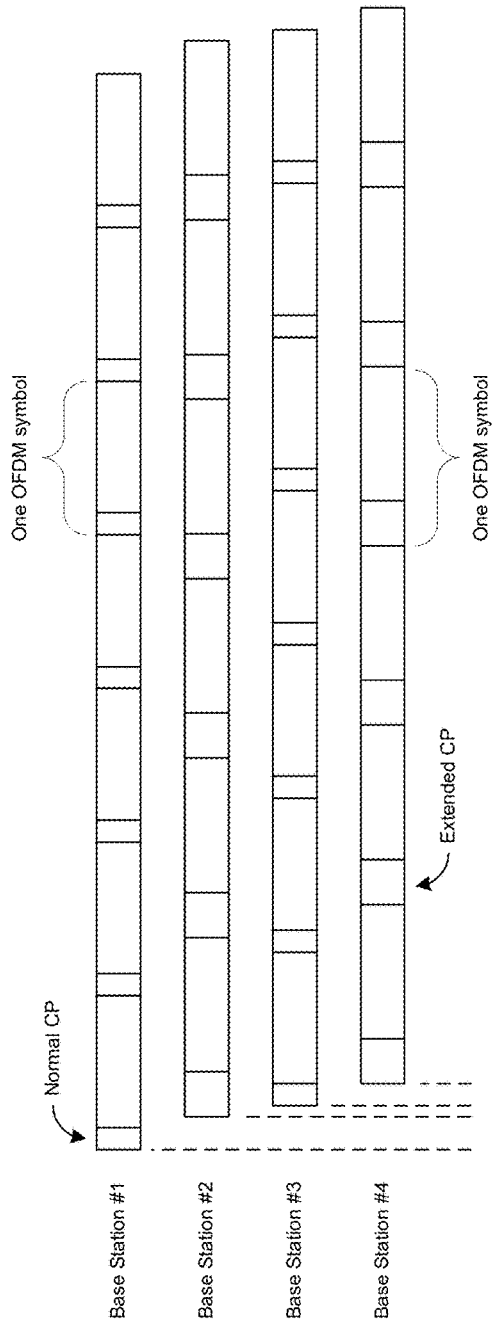
FIG. 5 illustrates OFDM signals from a set of base stations that are not time synchronized and using different CP lengths.
Figure 6:
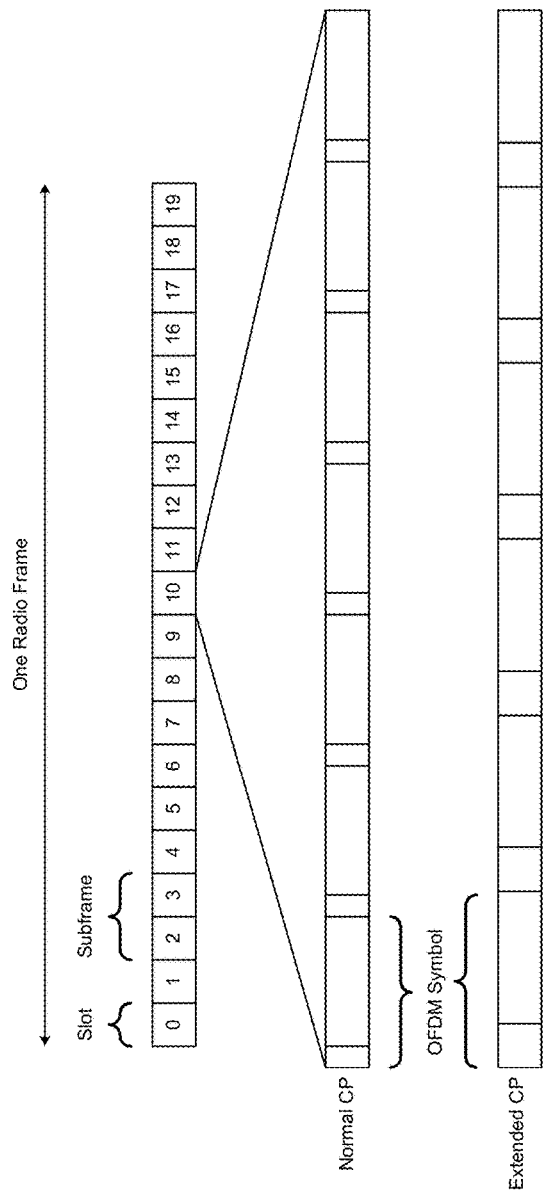
FIG. 6 illustrates the frame structure of the air interface of the 3GPP LTE wireless communication system.
Figure 7:
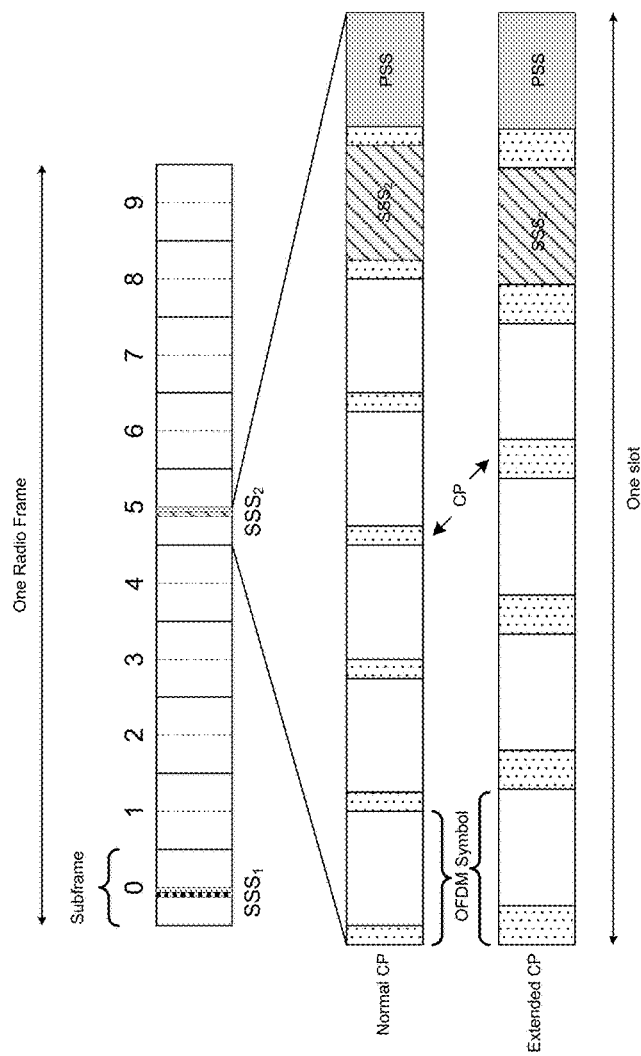
FIG. 7 illustrates the locations of PSS and SSS for Normal CP and Extended CP in case of FDD 3GPP LTE wireless communication system.
Figure 8:
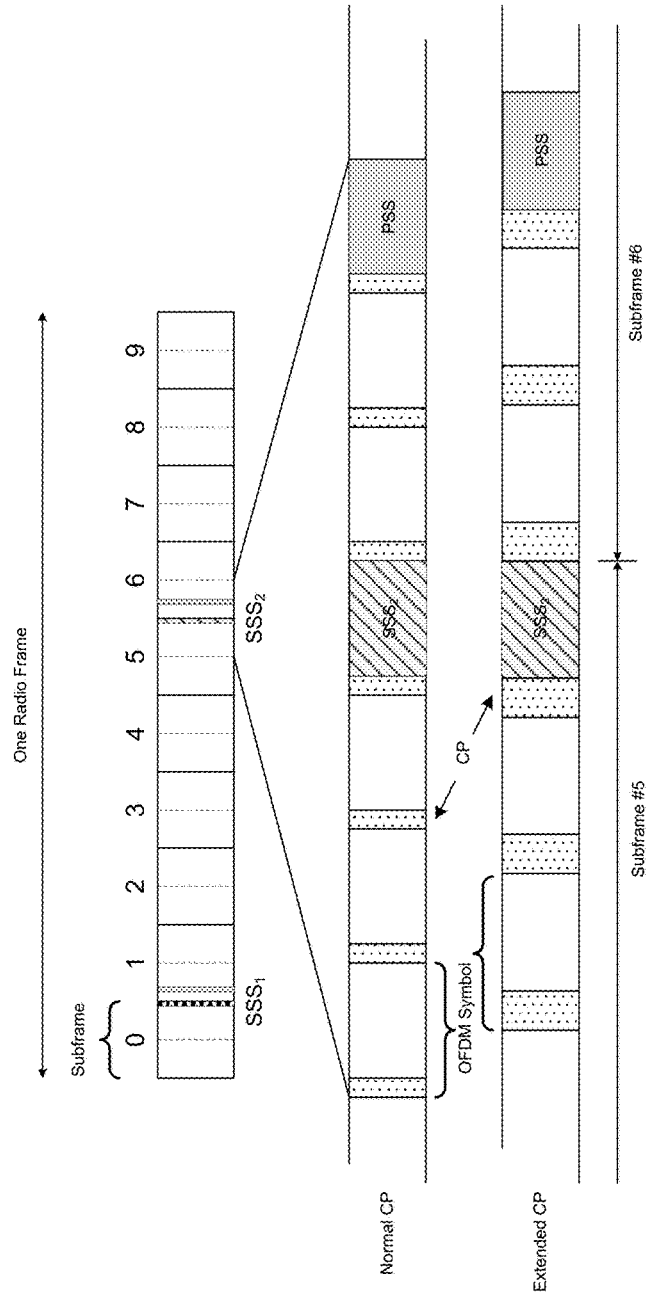
FIG. 8 illustrates the locations of PSS and SSS for Normal CP and Extended CP in case of TDD 3GPP LTE wireless communication system.
Figure 9:
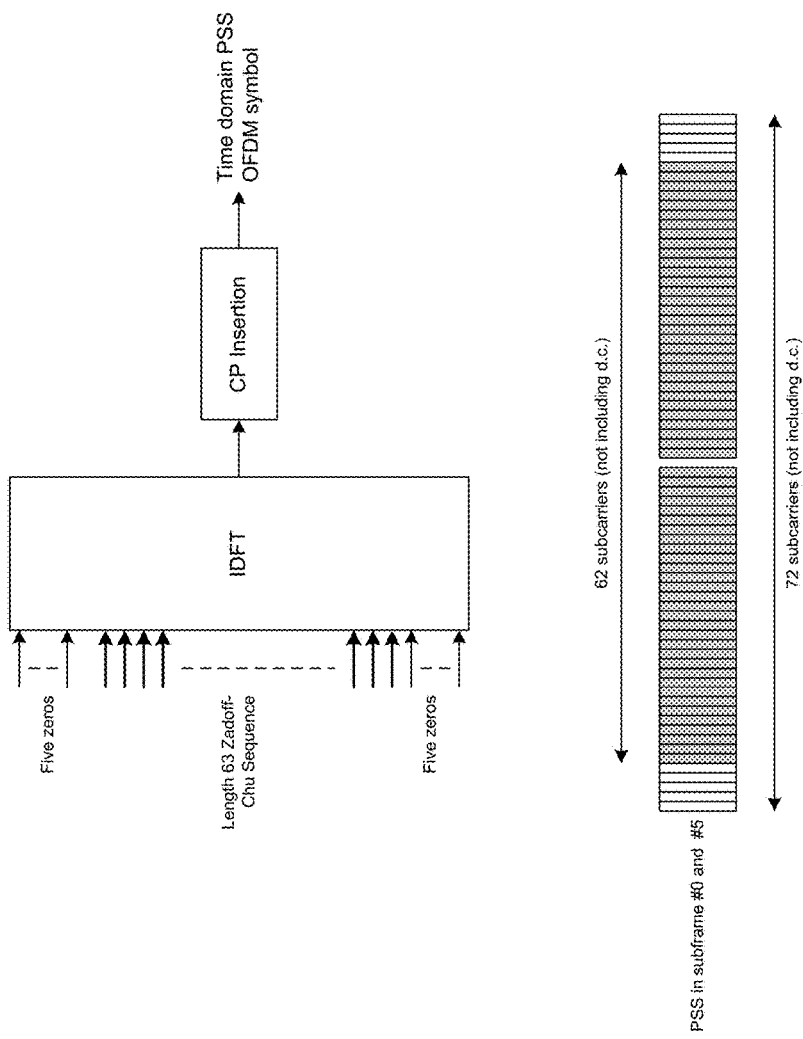
FIG. 9 illustrates PSS generation procedures for 3GPP LTE wireless communication system.
Figure 10:
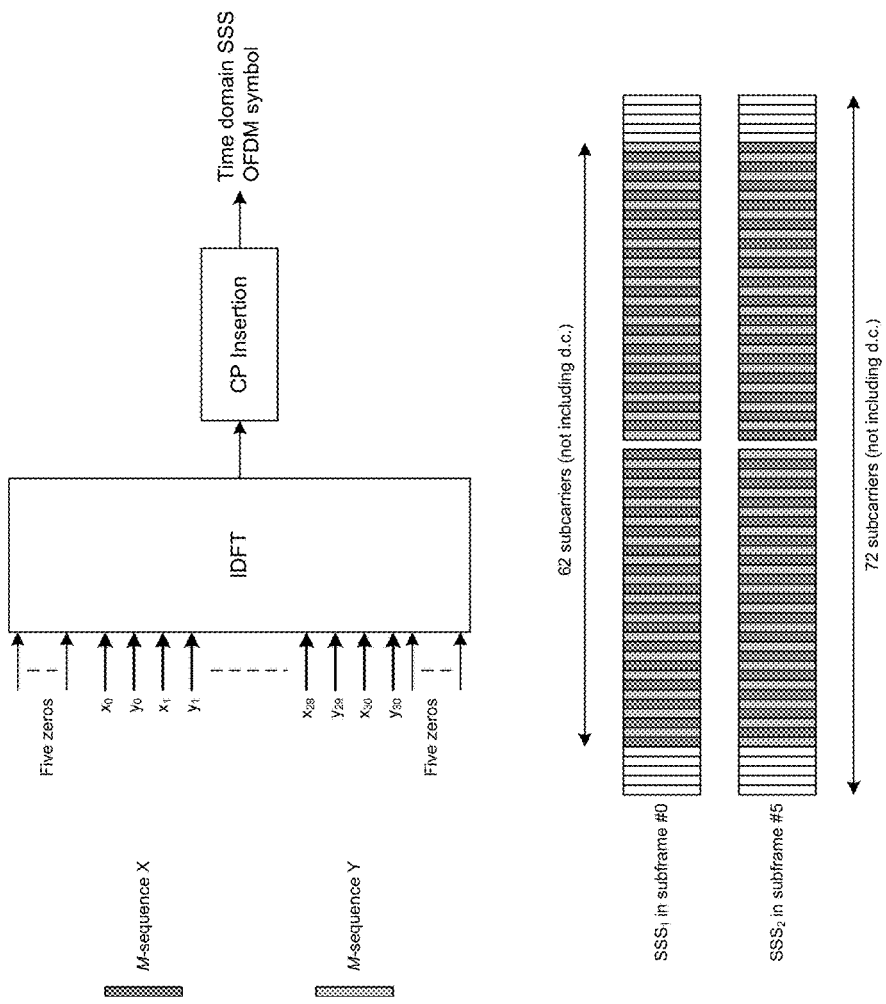
FIG. 10 illustrates SSS generation procedures for 3GPP LTE wireless communication system.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

The following terminology is used to describe the various aspects of the present disclosure. A reception and processing window opened for detecting PSS of cells in the surrounding area of a client terminal is defined as "PSS search." Similarly, a reception and processing window opened for detecting SSS of cells in the surrounding area of a client terminal is defined as "SSS search." Before an SSS search can begin, a PSS search must be completed successfully. The result of a successful PSS search may be a set of detected PSS indices and the exact time positions at which the PSSs are detected. The detected PSS time positions are referred herein as PSS offsets. The PSS offsets are specified relative to the start of a PSS search window. During SSS search, a number of PSS offsets and PSS index pairs may be configured as inputs. Within an SSS search, "SSS iteration" is scheduled for each of the PSS offset and PSS index pair. A single SSS iteration may involve the selection of specific set of samples from the received signal based on the PSS offset, performing Fast Fourier Transform (FFT) to convert the time domain signal to frequency domain, then M-sequence cross correlation and selection of top sequence candidates. SSS iteration involves a number of such "SSS detection" attempts. For a given PSS offset and PSS index pair, an SSS iteration may involve SSS detection attempts corresponding to the following combinations:

Detection corresponding to Normal CP or Extended CP.

Detection corresponding to a nominal position and ±1 or ±2 sample positions around it due to uncertainty in the exact timing of PSS detection.

Figure 11:
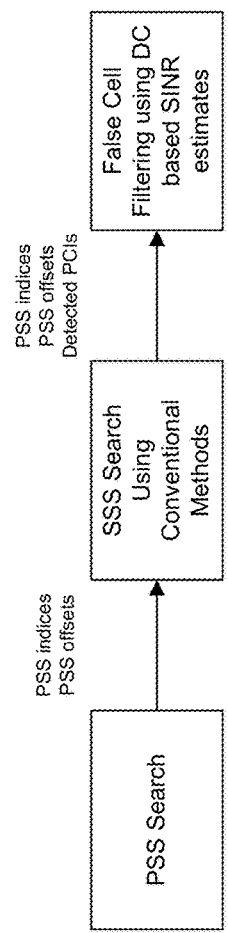
FIG. 11 illustrates a high level block diagram of the processing stages according to the aspects of the present disclosure.

According to an aspect of the present disclosure, the SSS search is performed using conventional method and the DC based SINR metric is used for further filtering of the false cells from the list of detected cells from the SSS search using conventional methods as illustrated in FIG. 11. In a group of cells detected by a client terminal, the cell with the highest detection metric is referred herein as a dominant cell. A drawback of the conventional method of SSS detection is that the PCI's with either $m_0$ or $m_1$ that is common to that of a dominant cell may be detected as false cells due to leakage in power from dominant cell's sequence. This drawback is present in conventional SSS search methods because the even and odd subcarriers. i.e., interlaced M-sequences, are processed separately. According to the aspects of the present disclosure, a false cell filtering window may be scheduled over which DC based SINR may be estimated for all the cells that are reported as a result of the SSS search using conventional method. Once the DC based SINR metrics are available for all the detected cells, the cells with DC based SINR metrics lower than configurable threshold values may be dropped as false cells. The cells which may have estimated SINR metric greater than or equal to the configured threshold values are considered to be valid cells.

In a second embodiment of the present disclosure, the DC based SINR metric may be estimated in parallel to the SSS search using conventional detection methods. This embodiment offers the advantage of filtering out the false cells at the same time as detecting true cells. This embodiment avoids the need for opening a separate reception and processing window primarily for false cells filtering. Since the SSS detection is ongoing during SSS search window, the DC based SINR metric may need to be estimated for all PCI groups for each of the two possible SSS instances, i.e., 2*168 combinations. In the first embodiment, the DC based SINR metric is estimated only for the cells that may be detected by the preceding SSS search using conventional methods.

In a third embodiment of the present disclosure, the FFT output of the different SSS iterations attempted during an SSS search may be stored and then may perform the DC based SINR metric estimation when the SSS search is completed. This embodiment avoids the need for opening a separate reception and processing window strictly for false cells filtering while keeping the DC based SINR metric estimation complexity low. This embodiment requires memory for storing the FFT outputs for each of the SSS iterations in an SSS search.

According to an aspect of the present disclosure, DC based SINR metrics from multiple receive chains may be coherently combined. For example when coherently combining two complex numbers, the real and imaginary parts from two complex numbers are combined separately while maintaining their respective signs. Furthermore, the DC based SINR may be obtained by using coherently combined intermediate metrics estimated for different instances of 5 ms SSS intervals. Coherent combining across receive chains and different SSS instances is possible because of descrambling of received frequency domain SSS signal as described below. The coherent combining strengthens the differential correlation for true cells in the presence of noise, fading and interference while weakens it for false cells.

The steps performed according to the aspects of the present disclosure for each of the detected cell from the conventional SSS method are as follows. The steps are described with the first embodiment as a reference.

Figure 12:
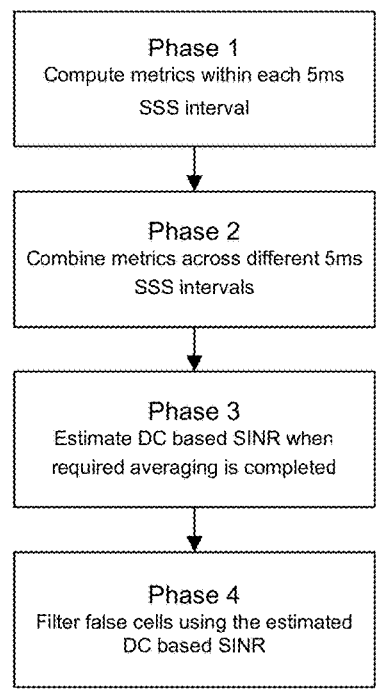
FIG. 12 illustrates a high level block diagram of the four phases of the processing for false cell filtering according to the aspects of the present disclosure.
Figure 13:
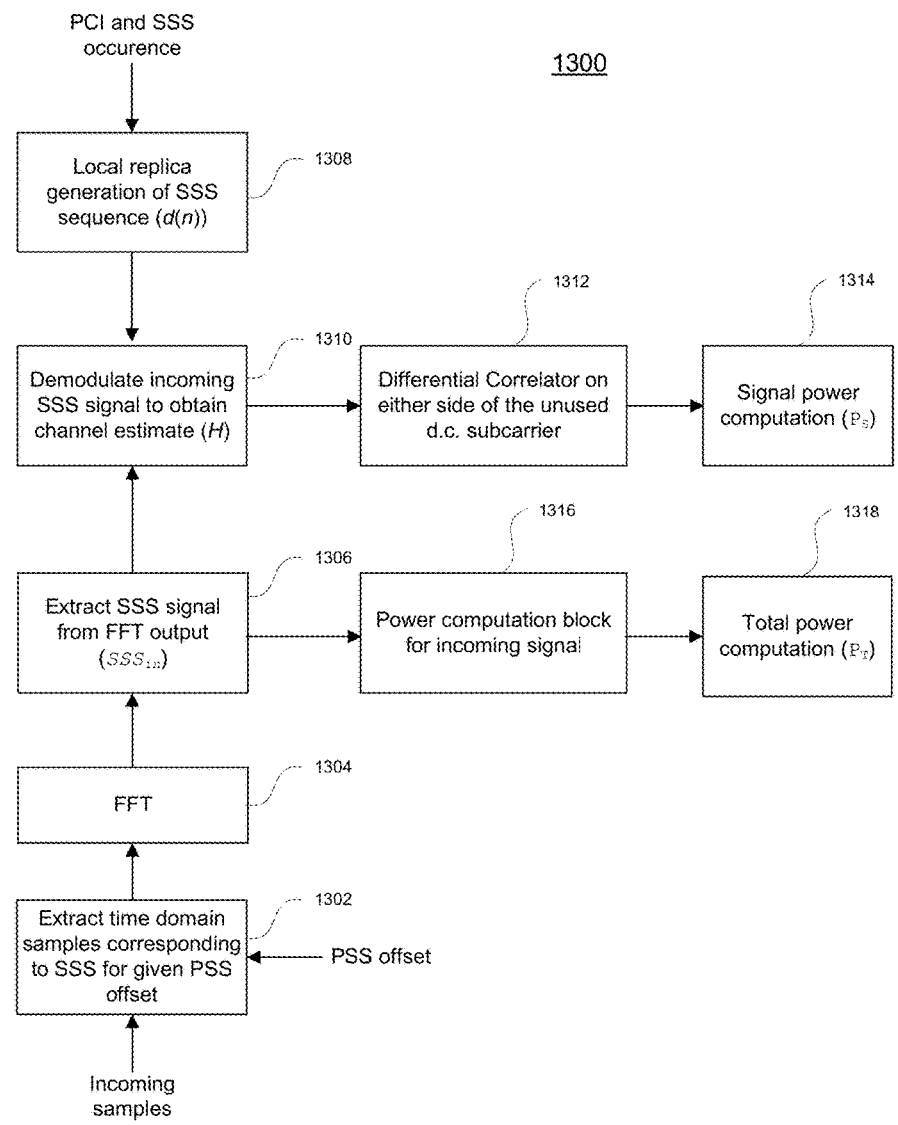
FIG. 13 illustrates the Phase 1 processing steps within each 5 ms window of the false cell filtering window for each of the detected cell according to the aspects of the present disclosure.
Figure 14:
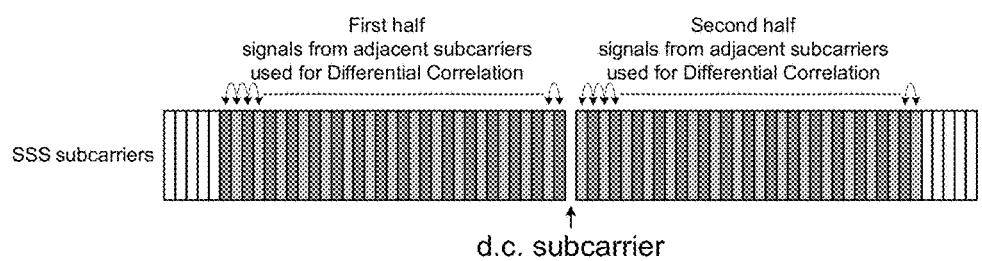
FIG. 14 illustrates the use of adjacent subcarriers for Differential Correlation (DC) across the two sides of the d.c. subcarrier in an SSS signal according to the aspects of the present disclosure.

The DC based SINR estimation and false cell filtering may be implemented in four phases as illustrated in FIG. 12 and described as follows:

Phase 1: Processing within each 5 ms SSS interval within the false cell filtering window Phase 2: Combining across different 5 ms SSS intervals of the false cell filtering window Phase 3: Computing DC based SINR when required averaging is completed Phase 4: False cells filtering using the estimated DC based SINR The Phase 1 processing aspects are illustrated in the block diagram 1300 contained in FIG. 13 and described as follows. According to an aspect of the present disclosure, for each 5 ms SSS interval, in the processing block 1302, from the incoming time domain samples, the samples corresponding to SSS based on the detected PSS time domain position, duplex type and CP type are extracted. At processing block 1304, FFT is performed on the extracted samples. At processing block 1306, the signal $SSS_{in}$ corresponding to the SSS subcarriers is extracted from the FFT output. At processing block 1308, the local replica generation is performed for the PCI and SSS occurrence of the detected cell for which the DC based SINR is to be estimated. The local replica d(n) may be generated using conventional M-sequence generation methods. At processing block 1310, the local replica signal d(n) is multiplied with the $SSS_{in}$ signal to demodulate and obtain the channel estimate H for the SSS as follows:

$$H(n) = SSS_{in}(n) \times d(n) \text{ for } n=1 \text{ to } 62 \qquad (1)$$

where d(n) in EQ. (1) is the interlaced $m_0$ and $m_1$ sequence which can take the values ±1. The $SSS_{in}$ is the received frequency domain SSS in which the DC component is removed. At processing stage 1312, Differential Correlation is computed using channel estimate H as follows. The signals from two adjacent subcarriers are used for differential correlation to estimate Signal power. Complex conjugate of a first value in the signal $SSS_{in}$ is multiplied with a second adjacent value of the signal $SSS_{in}$ to get the complex correlation value for the adjacent values. The d.c. subcarrier is skipped when performing Differential Correlation. Therefore there are two subsets of Differential Correlation values as illustrated in FIG. 14. The complex differential correlated terms from the two halves are coherently combined as follows:

$$DC(n) = H^*(n+1) \times H(n), 0 \le n \le 29 \qquad (2)$$

$$DC(n) = H^*(n+1) \times H(n), 31 \le n \le 60 \qquad (3)$$

$$DC = \sum_{n=0}^{29} DC(n) + \sum_{n=31}^{60} DC(n) \qquad (4)$$

After all the differentially correlated metrics are accumulated at processing stage 1312, the accumulated value is divided by the number of accumulated differential correlation terms to get averaged value $P_S$ at processing stage 1314.

$$P_S = \frac{DC}{60} \qquad (5)$$

The complex value $P_S$ may be used as an estimate of Signal power and output for storage for each of the detected cell list for further processing in Phase 2. According to an aspect of the present disclosure, all the processing steps from 1302 till 1314 may be applied to all the receive chains used by a client terminal. The coherent combining and averaging of differential correlation metric across receive chains may be performed. The averaged differential correlation, i.e., Signal power estimate $P_S$ computed in EQ (5), may be from a single receive chain or averaged over multiple receive chains.

At processing stage 1316, the SSS signal $SSS_{in}$ from processing block 1306 is used to estimate Total power $P_T$ by multiplying the signal with its complex conjugate i.e., $SSS_{in}^* \times SSS_{in}$. This is equivalent to $Real^2+Imag^2$ for a complex number. The 62 individual power terms are accumulated non-coherently to obtain the Total power of the incoming SSS signal as follows:

$$P_T = \frac{1}{62} * \sum_{n=0}^{61} SSS_{in}^*(n) \times SSS_{in}(n) \qquad (6)$$

Non-coherent combining herein means that the values of two or more quantities are added such that the signs of the two values are not considered. For example, when non-coherently combining power of complex numbers, $Real^2+Imag^2$ may be used.

The real valued Total power $P_T$ computed in EQ (6) may be output and stored for each of the detected cell for further processing in Phase 2. In case of multiple receive chains, the Total power computation is performed separately for each receive chain, combined non-coherently and then averaged.

Figure 15:
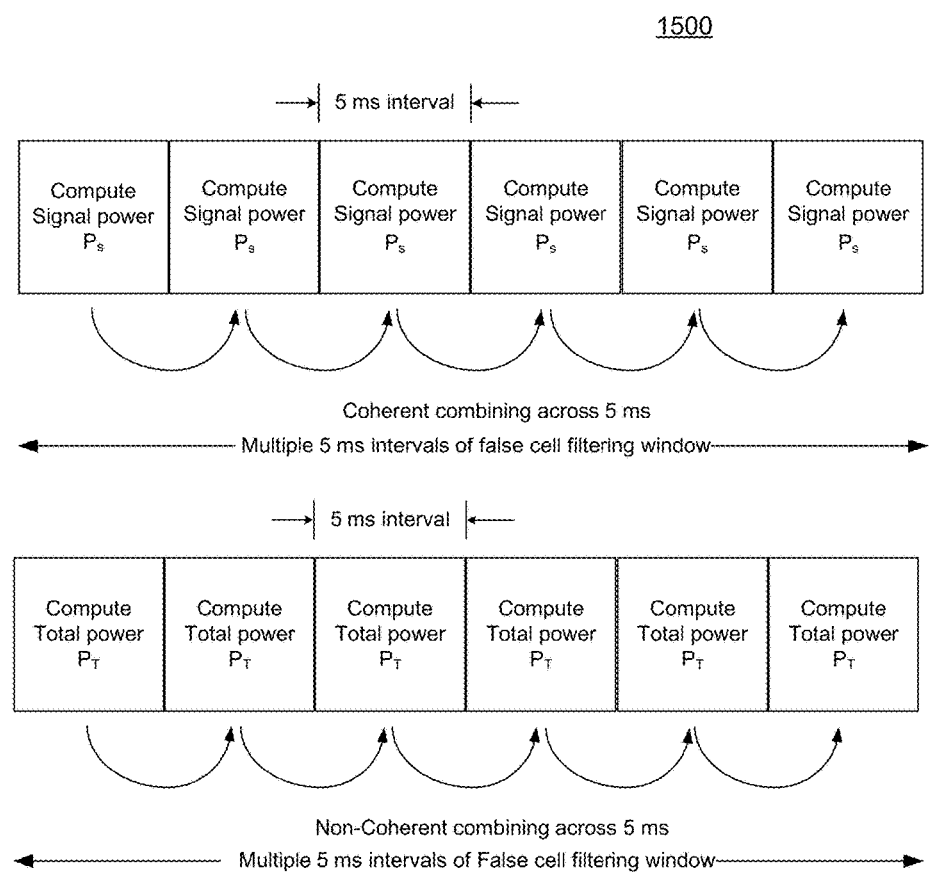
FIG. 15 illustrates the Phase 2 processing of combining of Signal power and Total power across different 5 ms intervals of the false cell filtering window for each of the detected cell according to the aspects of the present disclosure.

The Phase 2 processing aspects are illustrated in the block diagram 1500 contained in FIG. 15 for the example case of six SSS intervals in one false cells filtering window. According to an aspect of the present disclosure, the number of SSS intervals used in one false cells filtering window may be configurable. According to an aspect of the present disclosure, the Signal power estimate $P_S$ from each 5 ms SSS interval for each cell in the list of detected cells list is coherently combined. According to an aspect of the present disclosure, the Total power estimate $P_T$ from each 5 ms SSS interval for each cell in the list of detected cells list is coherently combined.

Figure 16:
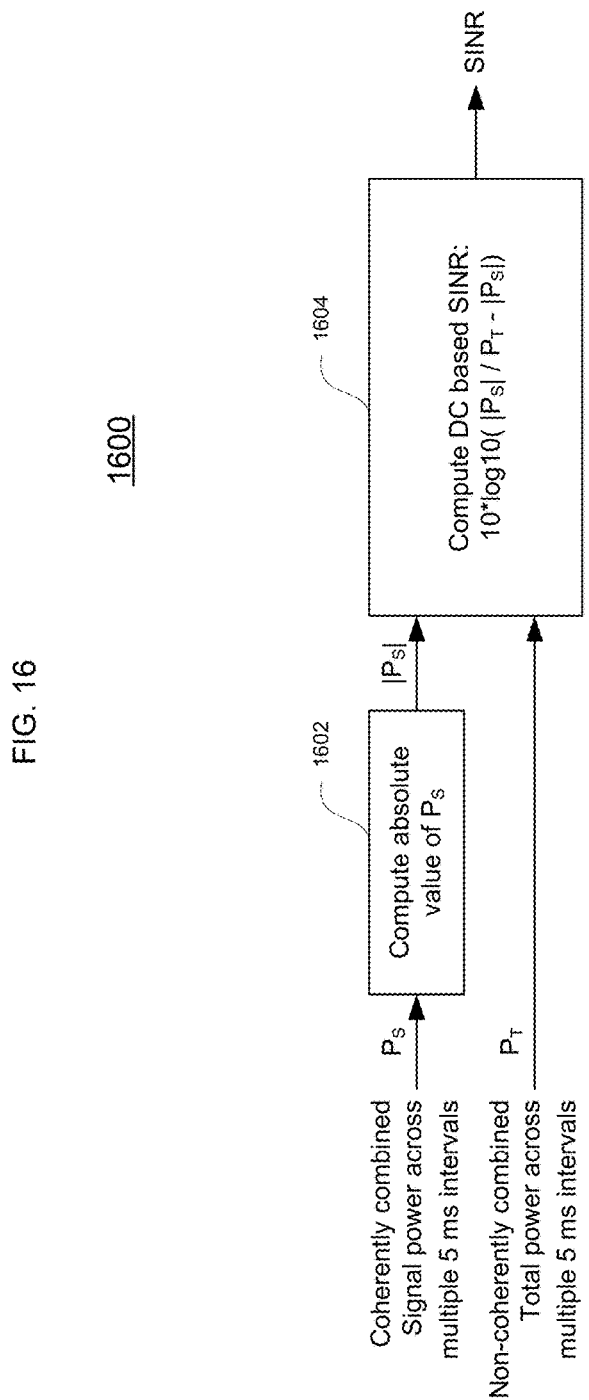
FIG. 16 illustrates the Phase 3 processing of false cell filtering window for each of the detected cell according to the aspects of the present disclosure.

The Phase 3 processing aspects are illustrated in the block diagram 1600 contained in FIG. 16. According to an aspect of the present disclosure, the complex valued Signal power estimate $P_S$ is input to the processing block 1602 which computes the absolute value of the Signal power estimate $P_S$. At processing block 1604, using the absolute value of the Signal power estimate $P_S$ and the total power estimate $P_T$ inputs the Differential Correlation based SINR is estimated as follows:

$$SINR = 10 * \log 10\left(\frac{|P_s|}{P_T - |P_s|}\right) \qquad (7)$$

Figure 17:
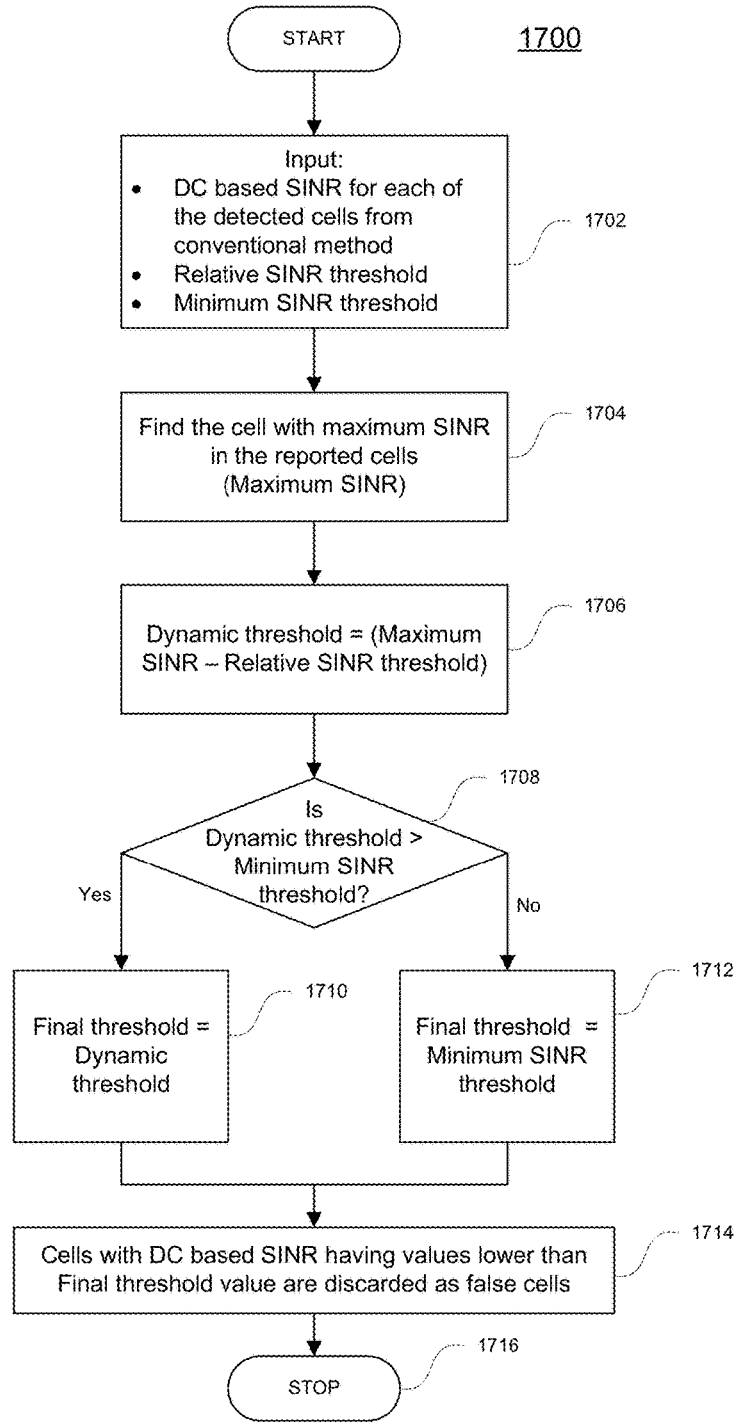
FIG. 17 illustrates the Phase 4 processing of false cell filtering based on DC based Minimum SINR threshold value and Relative SINR threshold value according to the aspects of the present disclosure.

The Phase 4 processing aspects are illustrated in the block diagram 1700 contained in FIG. 17. At processing stage 1702, the DC based SINR estimates for all the cells in the detected cells list from the SSS search are received as input. The Minimum SINR threshold and the Relative SINR threshold are also received as input. The Minimum SINR threshold is the absolute lowest value of the DC based SINR which a detected cell must have in order not to be discarded as a false cell. The Relative SINR threshold specifies the largest amount by which a weaker cell may be below the SINR of a cell found to have a highest DC based SINR (Maximum SINR) and not be considered a false cell. The Minimum SINR threshold and the Relative SINR threshold may be obtained using offline simulations or making offline measurements in a live 3GPP LTE network. At processing stage 1704, the cell having the Maximum SINR is found and the cell is called dominant cell. At processing stage 1706, Dynamic threshold is computed by subtracting the Relative SINR threshold from the Maximum SINR. At processing stage 1708, a determination is made whether the Dynamic threshold is greater than the Minimum SINR threshold. If the Dynamic threshold is greater than the Minimum SINR threshold, at processing stage 1710 the Final threshold is set equal to the Dynamic threshold. Otherwise, at processing stage 1710, the Final threshold is set equal to the Minimum SINR threshold. The processing then continues at stage 1714, where the DC based SINR for each detected cell is compared against the Final threshold. The cells with DC based SINR lower than the Final threshold are discarded as false cells. The remaining cells are considered to be true cells. The processing of false cell filtering suitably terminates at processing stage 1716.

The filtering using DC based SINR in combination with the conventional SSS detection method enables filtering of false cells which in turn reduces power consumption and improved performance of the client terminal and the network.

By way of example only, the above-described method may be implemented in a receiver, e.g., a user device such as a wireless mobile station (MS) 12 as shown in FIG. 1.

Figure 18:
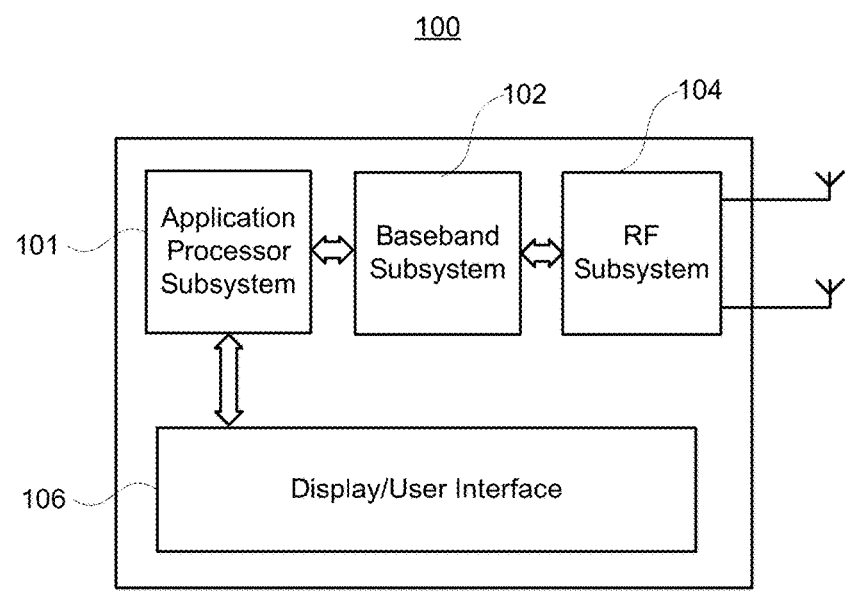
FIG. 18 illustrates a wireless mobile station diagram, which may be employed with aspects of the disclosure described herein.

As shown in FIG. 18, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 19:
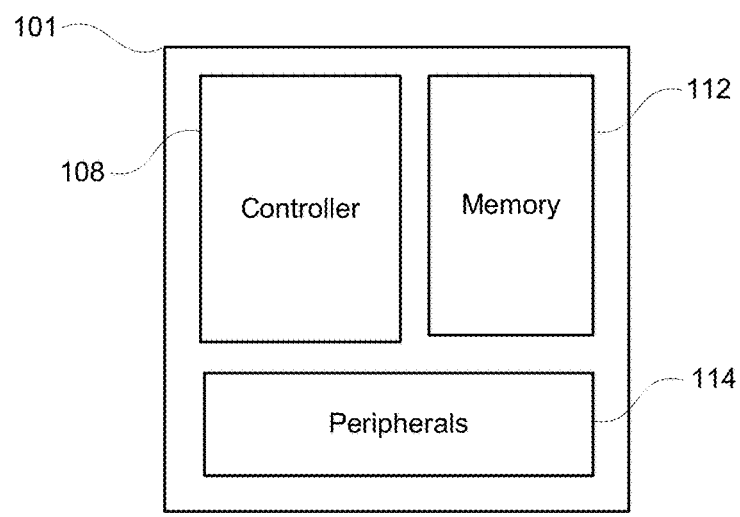
FIG. 19 illustrates an application processor subsystem for a wireless mobile station, which may be employed with aspects of the disclosure described herein.
Figure 20:
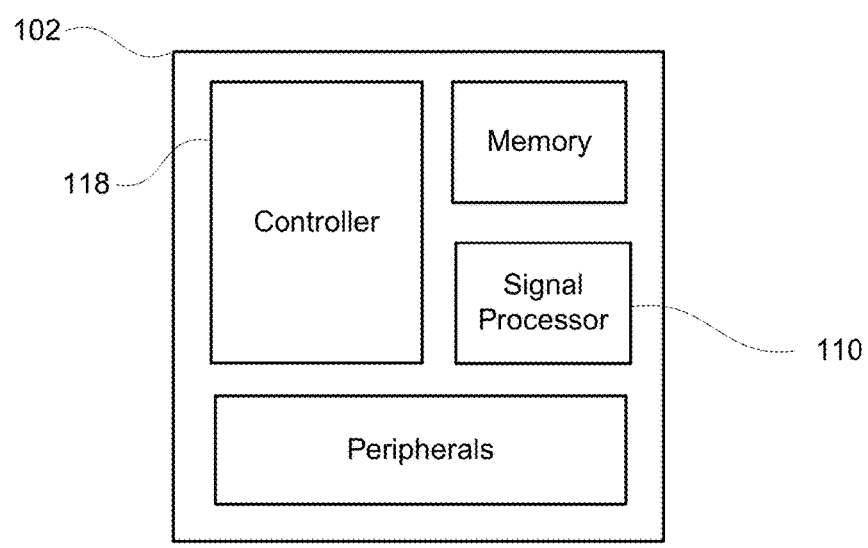
FIG. 20 illustrates a baseband subsystem for a wireless mobile station, which may be employed with aspects of the disclosure described herein.
Figure 21:
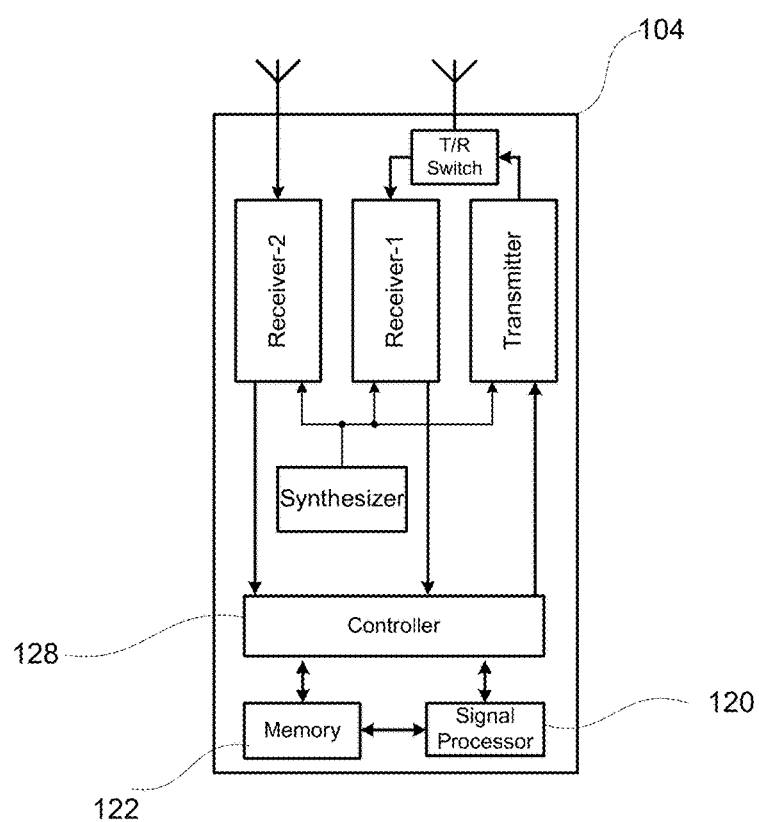
FIG. 21 illustrates an RF subsystem for a wireless mobile station, which may be employed with aspects of the disclosure described herein.

The application processor subsystem 101 as shown in FIG. 19 may include a controller 108 such as a microcontroller, another processor or other circuitry. The baseband subsystem 102 as shown in FIG. 20 may include a controller 118 such as a microcontroller or other processor. The RF subsystem 104 as shown in FIG. 21 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 20 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smart phones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for base station validation at a client device in a wireless communication system, the method comprising:
controlling, by a processing device, for each time domain sample extracted from a signal from a base station received at the client device and corresponding to a detected Primary Synchronization Signal (PSS) offset, searching an output from converting the time domain sample to frequency domain for a Secondary Synchronization Signal (SSS); and
controlling, by the processing device, for each base station indicated based on the searching for the SSS, determining whether a given base station is valid using a Differential Correlation (DC) based Signal to Interference plus Noise Ratio (SINR) metric corresponding to the base station,
wherein the DC based SINR metric is determined by performing (i) a cross-correlation between a frequency domain signal extracted from the output and a predetermined replica of a desired signal to obtain a cross-correlation output, and (ii) a differential correlation on the cross-correlation output.

2. The method of claim 1,
wherein a plurality of base stations is indicated based on the searching for the SSS, and wherein, for each of the plurality of base stations, the DC based SINR metric is determined over a predetermined filtering window.

3. The method of claim 2, further comprising:
controlling, by the processing device, determining, as a valid base station, each base station of the plurality of base stations having the DC based SINR metric greater than or equal to a predetermined threshold.

4. The method of claim 1,
wherein a plurality of base stations is indicated based on the searching for the SSS, and
the method further comprising:
controlling, by the processing device, during the searching for the SSS for a given base station of the base stations, determining the DC based SINR metric for the given base station.

5. The method of claim 1,
wherein a plurality of base stations is indicated from the searching for the SSS, and
wherein each time domain sample corresponding to a given detected PSS for a given base station of the base stations is converted to frequency domain by Fast Fourier Transform (FFT); and
the method further comprising:
controlling, by the processing device, for each PSS offset detected for the given base station, storing in a memory each SSS determined from searching the output of converting each time domain sample for the given base station corresponding to the PSS offset detected to frequency domain by Fast Fourier Transform, and
controlling, by the processing device, determining the DC based SINR metric for the given base station when the searching for the SSS for each PSS offset detected for the given base station is completed.

6. The method of claim 2,
wherein the DC based SINR metrics are determined respectively for the plurality of base stations by coherently combining intermediate metrics determined for different SSS intervals within the predetermined filtering windows.

7. The method of claim 1,
wherein a plurality of base stations is indicated based on the searching for the SSS, and the method further comprising:
controlling, by the processing device,
determining, from the plurality of base stations, a base station (Dominant Base Station) having a highest DC based SINR metric (Maximum SINR),
determining a Dynamic threshold by subtracting a Relative SINR from the Maximum SINR, in which the Relative SINR is a largest amount by which a DC based SINR metric of a given base station from the plurality of base stations can be less than the Maximum SINR of the Dominant Base Station and the given base station can be a potentially valid base station,
setting a Final Threshold equal to the Dynamic threshold, when the dynamic threshold is determined to be greater than an absolute lowest value of a DC based SINR metric for a second given base station from the plurality of base stations such that the second given base station can be a potentially valid base station (Minimum SINR),
setting the Final Threshold equal to the Minimum SINR, when the dynamic threshold is determined to be not greater than the Minimum SINR, and
determining, as a valid base station, each base station from the plurality of base stations having the DC based SINR metric greater than or equal to the Final Threshold.

8. An apparatus for base station validation at a client device in a wireless communication system, the apparatus comprising:
circuitry configured to control:
for each time domain sample extracted from of a signal from a base station received at the client device and corresponding to a detected Primary Synchronization Signal (PSS) offset, searching an output from converting the time domain sample to frequency domain for a Secondary Synchronization Signal (SSS); and for each base station indicated based on the searching for the SSS, determining whether a given base station is valid using a Differential Correlation (DC) based Signal to Interference plus Noise Ratio (SINR) metric corresponding to the base station, wherein the DC based SINR metric is determined by performing (i) a cross-correlation between a frequency domain signal extracted from the output and a predetermined replica of a desired signal to obtain a cross-correlation output, and (ii) a differential correlation on the cross-correlation output.

9. The apparatus of claim 8, wherein a plurality of base stations is indicated based on the searching for the SSS, and wherein, for each of the plurality of base stations, the DC based SINR metric is determined over a predetermined filtering window.

10. The apparatus of claim 9, wherein the circuitry is configured to control determining, as a valid base station, each base station of the plurality of base stations having the DC based SINR metric greater than or equal to a predetermined threshold.

11. The apparatus of claim 8, wherein a plurality of base stations is indicated based on the searching for the SSS, and wherein the circuitry is configured to control, during the searching for the SSS for a given base station of the base stations, determining the DC based SINR metric for the given base station.

12. The apparatus of claim 8, wherein a plurality of base stations is indicated from the searching for the SSS;

wherein each time domain sample corresponding to a given detected PSS for a given base station of the base stations is converted to frequency domain by Fast Fourier Transform (FFT); and wherein the circuitry is configured to control for each PSS offset detected for the given base station, storing in a memory each SSS determined from searching the output of converting each time domain sample for the given base station corresponding to the PSS offset detected to frequency domain by Fast Fourier Transform, and determining the DC based SINR metric for the given base station when the searching for the SSS for each PSS offset detected for the given base station is completed.

13. The apparatus of claim 9, wherein the DC based SINR metrics are determined respectively for the plurality of base stations by coherently combining intermediate metrics determined for different SSS intervals within the predetermined filtering windows.

14. The apparatus of claim 8, wherein a plurality of base stations is indicated based on the searching for the SSS; and wherein the circuitry is configured to control:

determining, from the plurality of base stations, a base station (Dominant Base Station) having a highest DC based SINR metric (Maximum SINR), determining a Dynamic threshold by subtracting a Relative SINR from the Maximum SINR, in which the Relative SINR is a largest amount by which a DC based SINR metric of a given base station from the plurality of base stations can be less than the Maximum SINR of the Dominant Base Station and the given base station can be a potentially valid base station, setting a Final Threshold equal to the Dynamic threshold, when the dynamic threshold is determined to be greater than an absolute lowest value of a DC based SINR metric for a second given base station from the plurality of base stations such that the second given base station can be a potentially valid base station (Minimum SINR), setting the Final Threshold equal to the Minimum SINR, when the dynamic threshold is determined to be not greater than the Minimum SINR, and determining, as a valid base station, each base station from the plurality of base stations having the DC based SINR metric greater than or equal to the Final Threshold.

15. A wireless communication device comprising:

a receiver for receiving a signal in a wireless communication system; and a processing device configured for base station validation, wherein the processing device is configured to control:

for each time domain sample extracted from of a signal from a base station received at the client device and corresponding to a detected Primary Synchronization Signal (PSS) offset, searching an output from converting the time domain sample to frequency domain for a Secondary Synchronization Signal (SSS); and for each base station indicated based on the searching for the SSS, determining whether a given base station is valid using a Differential Correlation (DC) based Signal to Interference plus Noise Ratio (SINR) metric corresponding to the base station, wherein the DC based SINR metric is determined by performing (i) a cross-correlation between a frequency domain signal extracted from the output and a predetermined replica of a desired signal to obtain a cross-correlation output, and (ii) a differential correlation on the cross-correlation output.

16. The wireless communication device of claim 15, wherein a plurality of base stations is indicated based on the searching for the SSS, and wherein, for each of the plurality of base stations, the DC based SINR metric is determined over a predetermined filtering window.

17. The wireless communication device of claim 16, wherein the processing device is configured to control determining, as a valid base station, each base station of the plurality of base stations having the DC based SINR metric greater than or equal to a predetermined threshold.

18. The wireless communication device of claim 15, wherein a plurality of base stations is indicated based on the searching for the SSS, and wherein the processing device is configured to control, during the searching for the SSS for a given base station of the base stations, determining the DC based SINR metric for the given base station.

19. The wireless communication device of claim 15, wherein a plurality of base stations is indicated from the searching for the SSS;

wherein each time domain sample corresponding to a given detected PSS for a given base station of the base stations is converted to frequency domain by Fast Fourier Transform (FFT); and wherein the processing device is configured to control or each PSS offset detected for the given base station, storing in a memory each SSS determined from searching the output of converting each time domain sample for the given base station corresponding to the PSS offset detected to frequency domain by Fast Fourier Transform, and determining the DC based SINR metric for the given base station when the searching for the SSS for each PSS offset detected for the given base station is completed.

20. The wireless communication device of claim 15, wherein a plurality of base stations is indicated based on the searching for the SSS; and wherein the processing device is configured to control:

determining, from the plurality of base stations, a base station (Dominant Base Station) having a highest DC based SINR metric (Maximum SINR), determining a Dynamic threshold by subtracting a Relative SINR from the Maximum SINR, in which the Relative SINR is a largest amount by which a DC based SINR metric of a given base station from the plurality of base stations can be less than the Maximum SINR of the Dominant Base Station and the given base station can be a potentially valid base station, setting a Final Threshold equal to the Dynamic threshold, when the dynamic threshold is determined to be greater than an absolute lowest value of a DC based SINR metric for a second given base station from the plurality of base stations such that the second given base station can be a potentially valid base station (Minimum SINR), setting the Final Threshold equal to the Minimum SINR, when the dynamic threshold is determined to be not greater than the Minimum SINR, and determining, as a valid base station, each base station from the plurality of base stations having the DC based SINR metric greater than or equal to the Final Threshold.

\* \* \* \* \*